United States Patent
Miretsky et al.

(10) Patent No.: US 11,317,244 B1
(45) Date of Patent: Apr. 26, 2022

(54) SYSTEM, METHOD, AND COMPUTER PROGRAM FOR MAKING TRAVEL ROUTE RECOMMENDATIONS BASED ON A NETWORK QUALITY OF SERVICE PREDICTION

(71) Applicant: Amdocs Development Limited, Limassol (CY)

(72) Inventors: Denis Miretsky, Raanana (IL); Yevgeny Shterental, Kfar Saba (IL); Vladimir Tkach, Kefar Yona (IL); Dmitry Belkin, Raanana (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/131,492

(22) Filed: Dec. 22, 2020

(51) Int. Cl.
*H04W 4/024* (2018.01)
*H04W 24/08* (2009.01)

(52) U.S. Cl.
CPC .......... *H04W 4/024* (2018.02); *H04W 24/08* (2013.01)

(58) Field of Classification Search
None
See application file for complete search history.

(56) References Cited

U.S. PATENT DOCUMENTS

| | | | |
|---|---|---|---|
| 6,954,435 B2 * | 10/2005 | Billhartz | H04L 47/728 370/252 |
| 7,941,108 B2 | 5/2011 | Shaffer et al. | |
| 8,311,741 B1 | 11/2012 | Lawther et al. | |
| 8,620,339 B2 * | 12/2013 | McCormick | H04W 24/10 455/452.2 |
| 9,002,644 B2 | 4/2015 | Wang et al. | |
| 10,448,283 B2 | 10/2019 | Bongaarts et al. | |
| 10,746,558 B2 * | 8/2020 | Muldoon | G01C 21/3453 |
| 2015/0338220 A1 * | 11/2015 | Choi | G01C 21/26 701/537 |
| 2019/0379592 A1 * | 12/2019 | Samadi | H04L 43/14 |
| 2020/0267498 A1 | 8/2020 | Draper et al. | |

FOREIGN PATENT DOCUMENTS

| | | |
|---|---|---|
| CN | 1224281 C | 10/2005 |
| EP | 3203188 A1 | 8/2017 |

OTHER PUBLICATIONS

U.S. Cellular, "USA National Data/4G LTE Coverage," U.S. Cellular, 2020, 7 pages, retrieved from https://www.uscellular.com/coverage-map/voice-and-data-maps on Dec. 22, 2020.

Barney, J., "Cellphone service not working? You are not alone," News4Jax, Jun. 15, 2020, 6 pages, retrieved from https://www.news4jax.com/sports/2020/06/15/cell-phone-service-not-working-you-are-not-alone/.

Leggett, J., "Which network has the best mobile phone coverage?" broadbandchoices, Sep. 30, 2020, 21 pages, retrieved from https://www.broadbandchoices.co.uk/guides/mobile/mobile-coverage.

* cited by examiner

Primary Examiner — Adolf Dsouza
(74) Attorney, Agent, or Firm — Zilka-Kotab, P.C.

(57) ABSTRACT

At least one target destination of a consumer is determined. A quality of service (QOS) of a network at each target destination of the at least one target destination is predicted. One or more travel route recommendations are made to the consumer, based on the predicted QOS of the network at each target destination of the at least one target destination.

20 Claims, 7 Drawing Sheets

SYSTEM, METHOD, AND COMPUTER PROGRAM FOR MAKING TRAVEL ROUTE RECOMMENDATIONS BASED ON A NETWORK QUALITY OF SERVICE PREDICTION

FIELD OF THE INVENTION

The present invention relates to techniques for predicting network quality of service.

BACKGROUND

Heavy and unpredictable network usage in a certain area, or software/hardware failures in a network, often causes overload on Service Providers' towers and loss of quality of service (QOS) for consumers (e.g. service subscribers). For example, an event occurring in an area which causes an unusual surge of network usage may negatively impact the QOS of a consumer. When the consumer is unaware of the event, the consumer may not know to avoid the area in order to maintain a certain level of QOS.

As another example, an existing Service Provider's services may not be fully accessible in different areas of a specific country. In such case, a consumer that needs to get access to the Service Provider's service may also not know to avoid those areas, and therefore cannot be guaranteed to get an expected QOS.

There is thus a need for addressing these and/or other issues associated with the prior art.

SUMMARY

As described herein, a system, method, and computer program are provided for making travel route recommendations based on a network quality of service (QOS) prediction. At least one target destination of a consumer is determined. A quality of service (QOS) of a network at each target destination of the at least one target destination is predicted. One or more travel route recommendations are made to the consumer, based on the predicted QOS of the network at each target destination of the at least one target destination.

DETAILED DESCRIPTION

Figure 1:
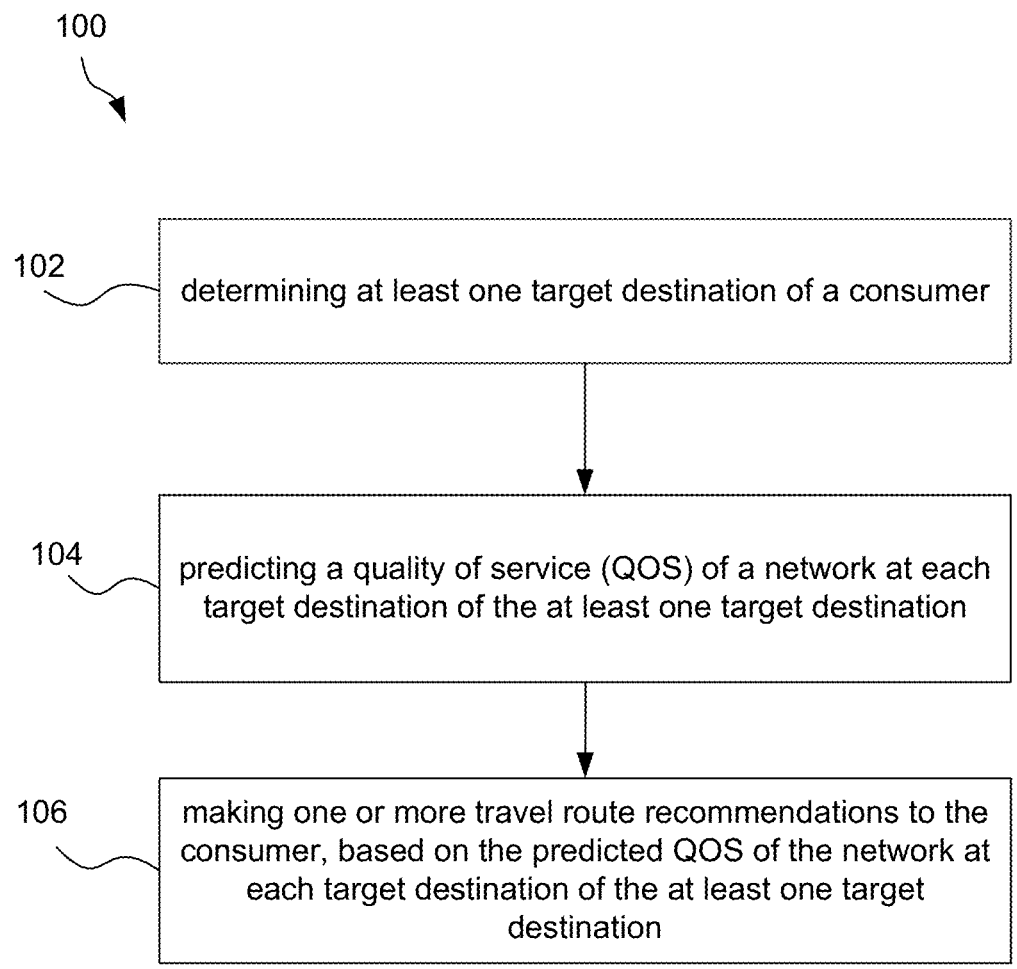
FIG. 1 illustrates a method for making travel route recommendations based on a network quality of service (QOS) prediction, in accordance with one embodiment.

FIG. 1 illustrates a method 100 for making travel route recommendations based on a network quality of service (QOS) prediction, in accordance with one embodiment. The method 100 may be performed any computer system described below with respect to FIGS. 6 and/or 7.

In operation 102, at least one target destination of a consumer is determined. The consumer may be any mobile device that is configured to communicate over one or more networks. For example, the consumer may be a mobile phone, tablet, laptop computer, network connected vehicle, etc.

The at least one target destination may be any destination (e.g. region, city, street, etc.) to which the consumer is determined to be destined. In one embodiment, the at least one target destination may be determined based on an existing travel route being taken by the consumer and/or historical routes taken by the consumer. In another embodiment, the at least one target destination may be specified by the consumer (e.g. via an input to a map application).

In one exemplary embodiment, the at least one target destination may include a plurality of destinations along the expected travel route of the consumer. In another exemplary embodiment, the at least one target destination may include a single, final target destination of the consumer.

In operation 104, a QOS of a network at each target destination of the at least one target destination is predicted. The QOS may be predicted based on any desired information associated with the at least one target destination. In one embodiment, the QOS may be predicted using one or more machine learning models.

By way of example, event information for each target destination of the at least one target destination may be gathered. The event information may include current events, future events and past events associated with the target destination. Optionally, the event information may be gathered from a plurality of different sources (e.g. websites), such as social networking websites, community websites, regional websites, etc. The event information may then be used to predict the QOS at each target destination.

As noted above, a machine learning model may be used to predict the QOS at each target destination. In this case, for example, the machine learning model may predict the QOS at each target destination based on past QOS at the target destination, and based on any events at the target destination (e.g. identified from the gathered event information, such as future events at the target destination which may coincide with the consumer's travel in the target destination, current emergency events at the target destination, etc.). Optionally, the machine learning model may predict the QOS at each target destination further based on expected attendance at the future events at the target destination. In one embodiment, the expected attendance may be predicted using an additional machine learning model. As another option, the machine learning model may predict the QOS at each target destination further based on a number of cell towers and signal strength at the target destination.

In operation 106, one or more travel route recommendations are made to the consumer, based on the predicted QOS of the network at each target destination of the at least one target destination. The one or more recommendations may be provided to the consumer via one or more push notifications.

In one embodiment, the one or more travel route recommendations may include a new travel route to the target destination. The new travel route may be selected, determined, etc. for having an improved QOS with respect to the predicted QOS of each target destination of the at least one target destination. As an option, the new travel route may be determined based on preferences of the consumer, such as a preferred network service provider.

In another embodiment, the one or more travel route recommendations may include an optimal list of network service providers on an existing travel route of the consumer. The optimal list may include one or more top ranked service providers per target destination. This may allow the consumer to make decisions regarding switching network service providers while on the travel route to obtain a certain level of QOS (e.g. by employing an eSIM with switching capabilities between network service providers). In yet another embodiment, the one or more travel route recommendations may indicate coverage data of network service providers on an existing travel route of the consumer.

To this end, travel route recommendations may be made for a consumer based on a network QOS prediction related to target destination(s) of the consumer. This may allow the consumer to change an existing route and/or change service providers, in order to improve a level of QOS provided to the consumer, before the QOS is negatively impacted (e.g. by certain events, lack of coverage, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
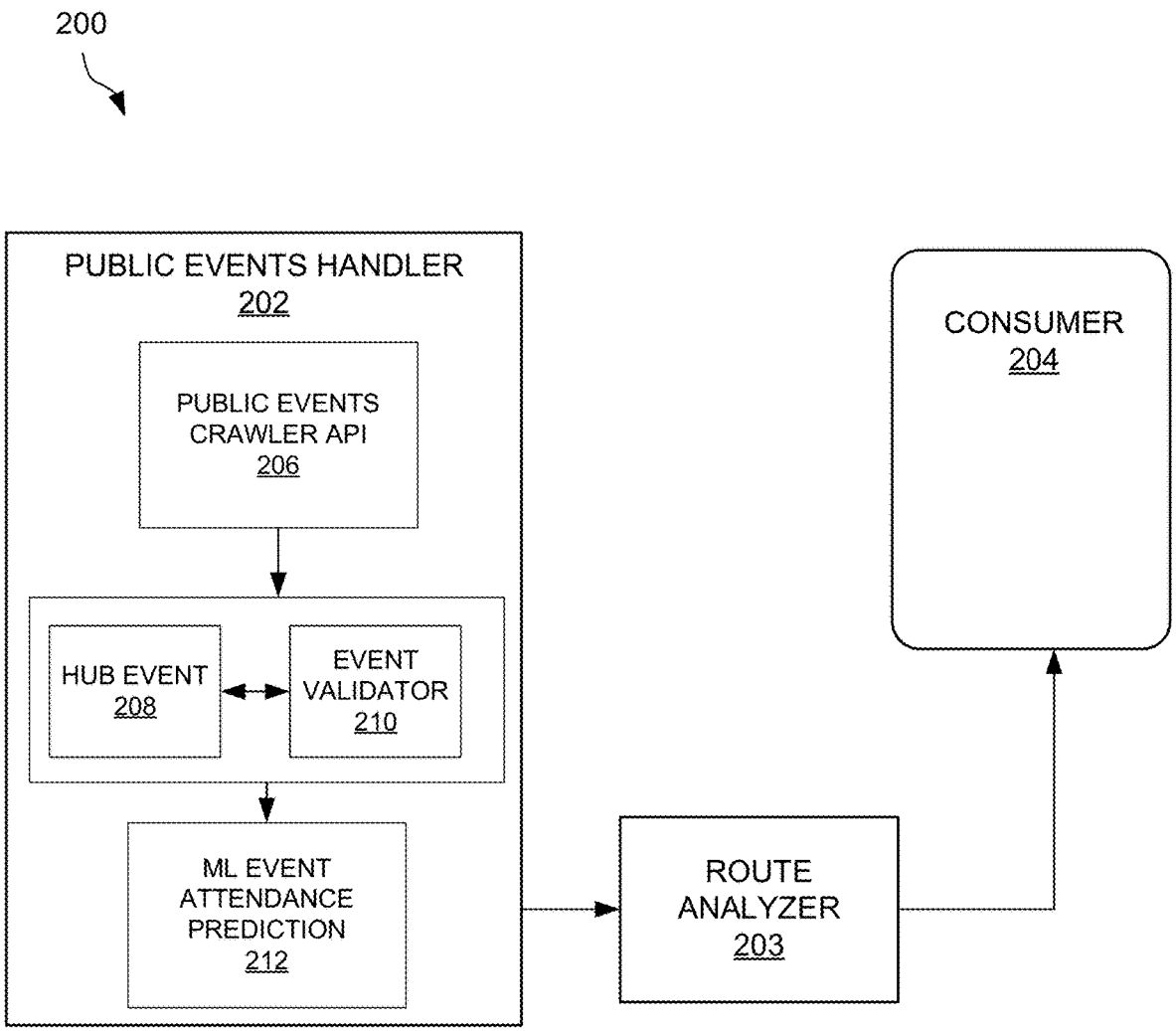
FIG. 2 illustrates a system flow diagram for making travel route recommendations to a consumer based on a network QOS prediction, in accordance with one embodiment.

FIG. 2 illustrates a system flow diagram 200 for making travel route recommendations to a consumer based on a network QOS prediction, in accordance with one embodiment. As an option, the system flow diagram 200 may be implemented in the context of the details of the previous figure and/or any subsequent figure(s). Of course, however, the system flow diagram 200 may be implemented in the context of any desired environment. Further, the aforementioned definitions may equally apply to the description below.

As shown, a public events handler 202 communicates with a route analyzer 203 to provide travel route recommendations to a consumer. As an overview, the public events handler 202 is responsible for gathering current, future and past events from various sources (e.g. social networks, dedicated event websites, community sites). The public events handler 202 evaluates the impact on the QOS expected on the route/region and provides an adapted route based on that.

The public events handler 202 includes a public events crawler application programming interface (API) 206. The public events crawler API 206 gathers information about events in the target destination (region) by crawling social network sites and invoking public APIs provided by social networks, websites of community portals like municipalities in the region and forums, etc.

The public events handler 202 includes a HUB event component 208 which will store the events metadata gathered by the public events crawler API 206. The public events handler 202 includes an event validator 208, which allows users to validate an event and rank the QOS in the corresponding region in real-time. The public events handler 202 includes a machine learning (ML) event attendance prediction component 210 which is responsible for analyzing the past QOS and real-time QOS and for predicting the expected QOS for the consumer, taking into consideration various facts such as a number of cell towers and signal strength in the region, a number of users that are expected to attend the event, etc. In this way, the public events handler 202 can predict the QOS in the region of the event.

The route analyzer 203 will use the predicted QOS to calculate and provide an adapted route.

Figure 3:
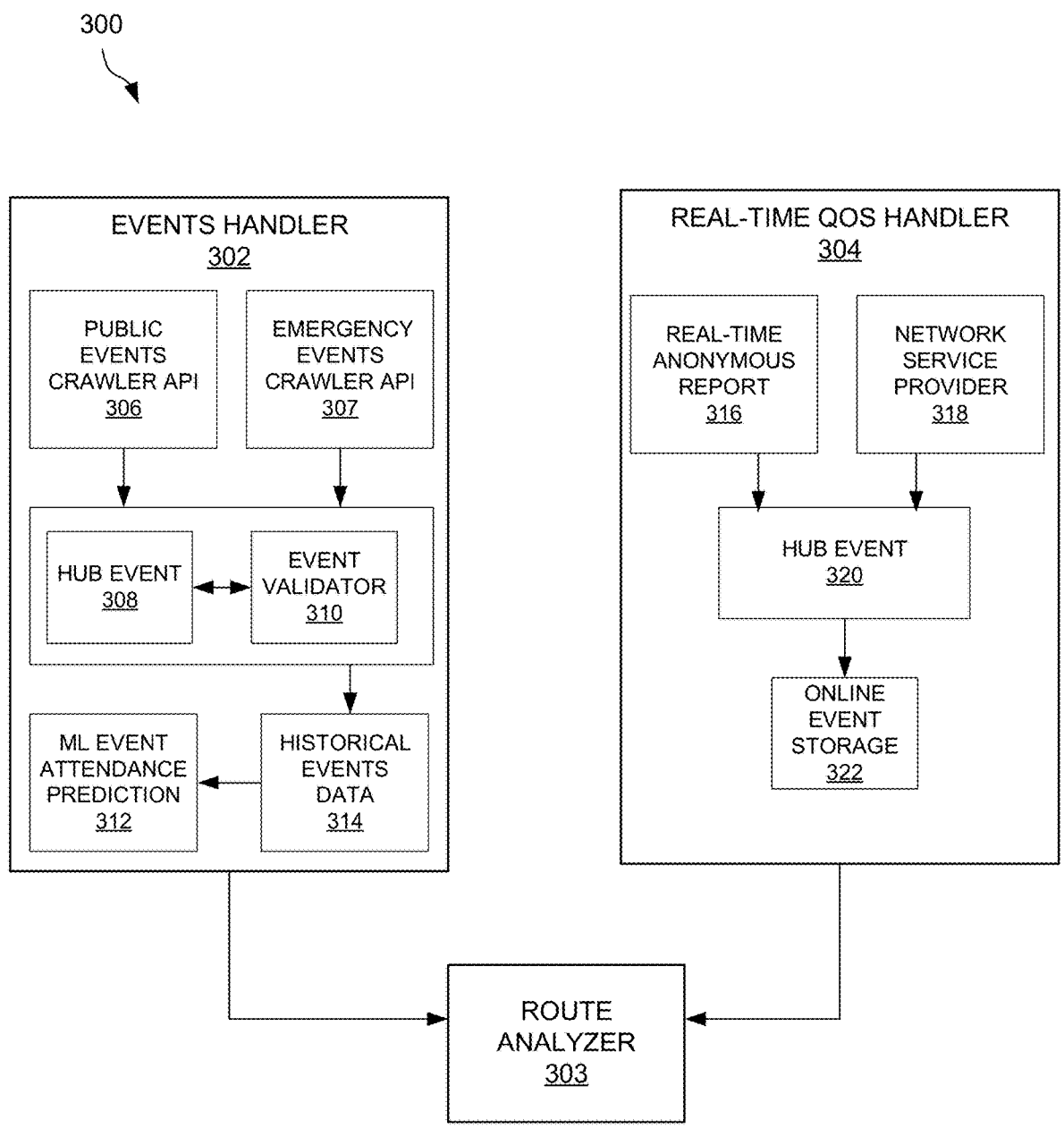
FIG. 3 illustrates a system flow diagram for making travel route recommendations based on a network QOS prediction from event information and real-time QOS information, in accordance with one embodiment.

FIG. 3 illustrates a system flow diagram 300 for making travel route recommendations based on a network QOS prediction from event information and real-time QOS information, in accordance with one embodiment. As an option, the system flow diagram 300 may be implemented in the context of the details of the previous figure and/or any subsequent figure(s). Of course, however, the system flow diagram 300 may be implemented in the context of any desired environment. Further, the aforementioned definitions may equally apply to the description below.

As shown, a public events handler 302 and a real-time QOS handler 304 communicate with a route analyzer 303 (i.e. to provide travel route recommendations to a consumer).

Similar to FIG. 2, the public events handler 302 includes a public events crawler API 306. However, the public events handler 302 also includes an emergency events crawler API 307. For example, there can be emergency events which lead to not working or malfunctioning cell towers, negatively impacting QOS for the network in the region. For these cases, the network service providers may publish notifications about the emergency events on their official social network accounts, which may be gathered by the emergency events crawler API 307.

The public events handler 302 includes the HUB event component 308 which will store the events metadata gathered by the public events crawler API 306 and the emergency events crawler API 307. Similar to FIG. 2, the public events handler 302 includes an event validator 310, which allows users to validate an event and rank the QOS in the corresponding region in real-time. The validated events are stored as historical events data 314. Similar to FIG. 2, the public events handler 202 includes a machine learning (ML) event attendance prediction component 312 which predicts planned event attendance based on cyclic pattern of past events in current area. In this way, the public events handler 202 can predict the QOS in the region of the event.

The real-time QOS handler 304 obtains real-time anonymous QOS reports from consumers 316 and QOS information from the network service providers 318. This QOS information is stored in a HUB event component 320. The real-time QOS handler 304 includes an offline report storage 322 which stores previous reports for analyzing attendance in case no live feedback from consumers or network service s is available for the current area.

The route analyzer 303 will use the predicted QOS and real-time QOS information to calculate and provide an adapted route.

In various use cases, the route analyzer 303 can:

1) Provide an optimal list of network service providers on the consumer's route based on the most up-to-date data aggregated from all available network service providers in the region and real time data gathered from other consumers and processed by the machine learning system.

2) Provide coverage data of network service providers in the region implying history of consumers in the region which would consider their device models, visit duration, season of the year, crowdedness in case of repeating events and routes. From the predictions output by the machine learning system, it can be understood if expected parameters match the consumer's requirements. For example, it can be visualized as a multi-layer map with timeline-based network quality.

3) Provide the optimal route to the consumer's destination based on his preferences, such as a specific network service provider, price range, number of required network service provider switches during the trip, etc.

Figure 4:
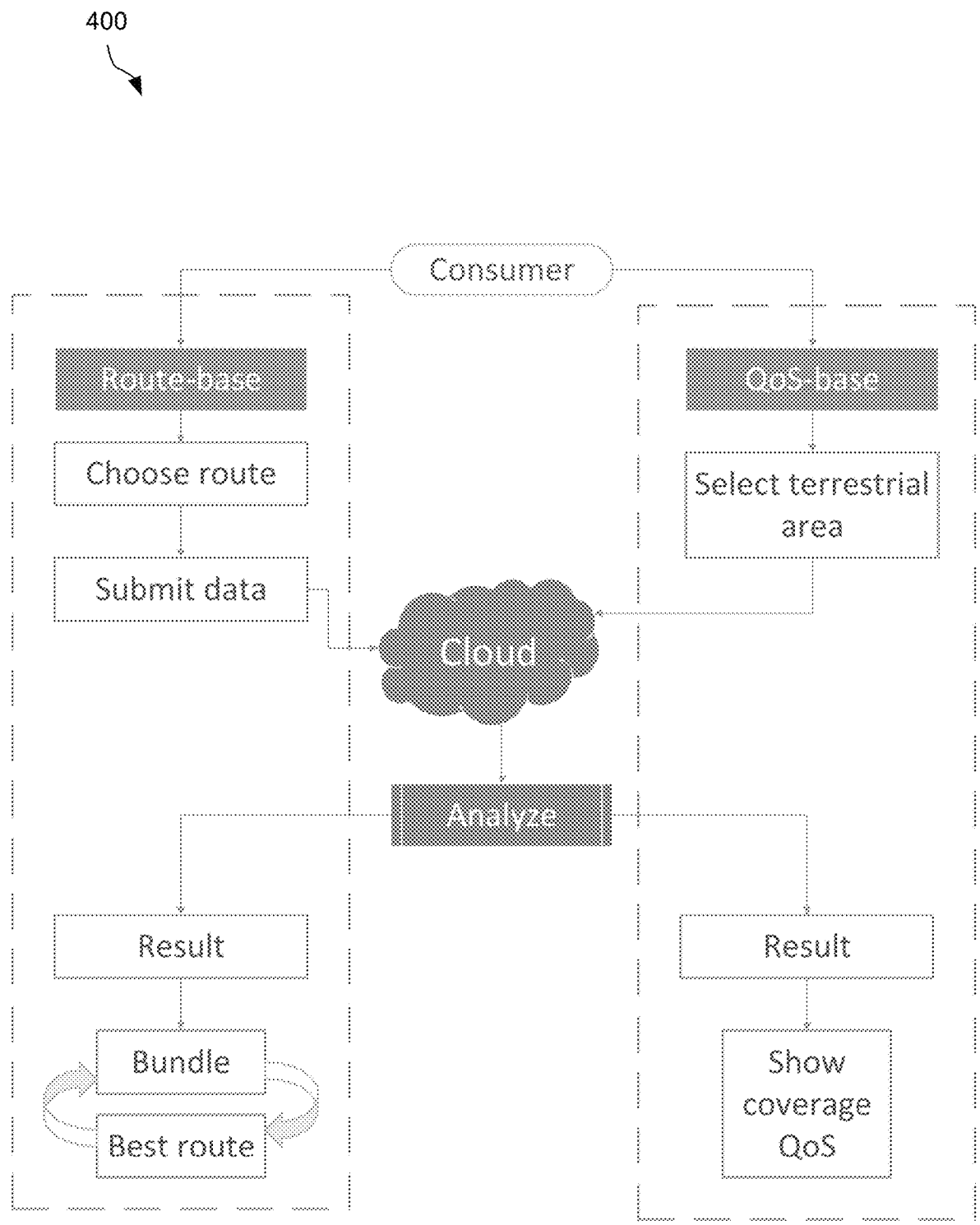
FIG. 4 illustrates use cases for making travel route recommendations to a consumer based on a network QOS prediction and consumer preferences, in accordance with one embodiment.
Figure 5:
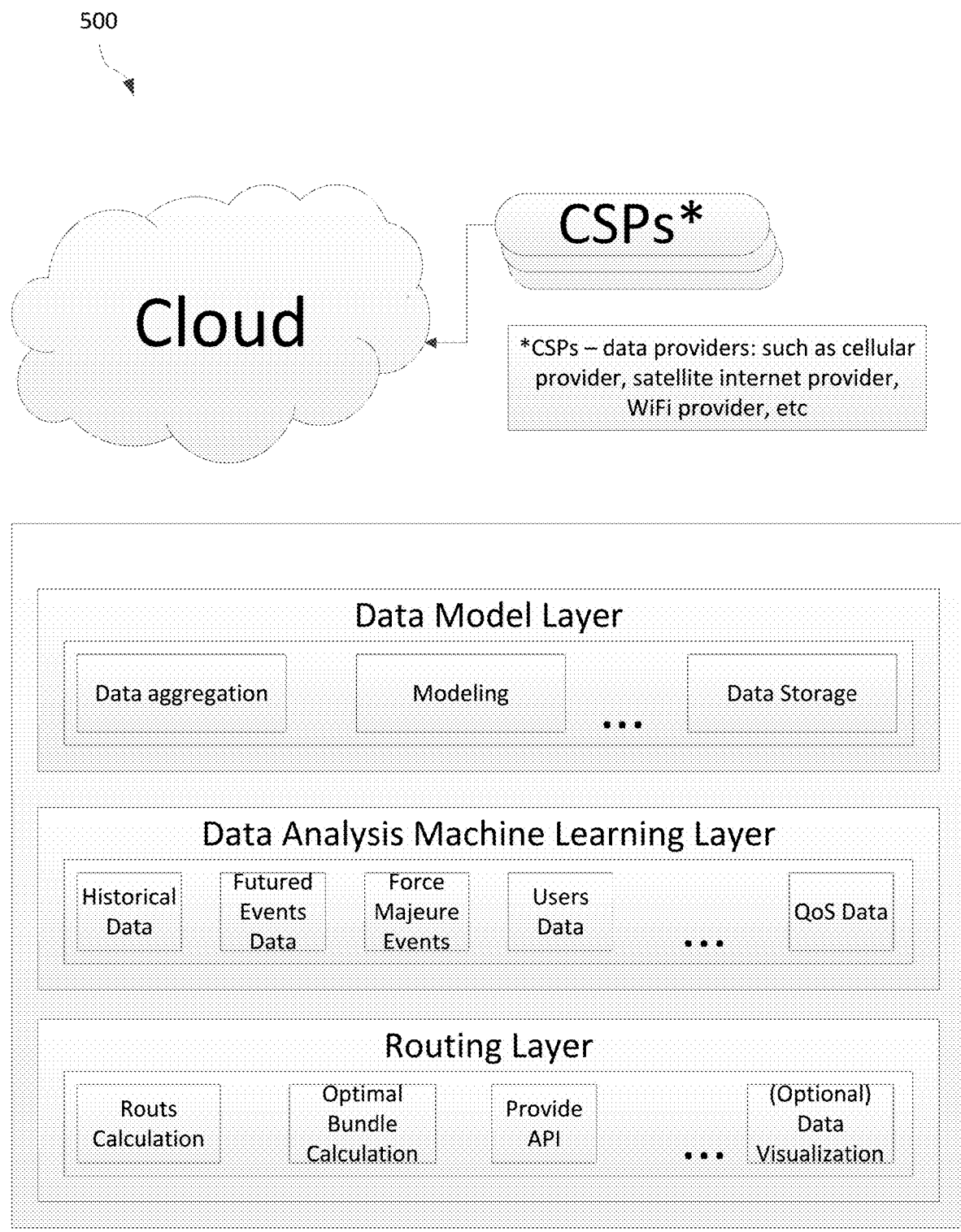
FIG. 5 illustrates a block diagram of a system architecture interfacing network service providers to make travel route recommendations to consumers based on network QOS predictions, in accordance with one embodiment.

FIG. 4 illustrates use cases 400 for making travel route recommendations to a consumer based on a network QOS prediction and consumer preferences, in accordance with one embodiment. FIG. 5 illustrates the system 500 implementing the use cases 400.

Two main use cases may be employed for a consumer:

Route-Based

Consumer chooses the preferable route (specific places, road, part of road, areas, etc.), by using, for example, Map API, natural language processing search, Voice (Siri like), etc.

After consumer's input, the system sends provided data to the processing cloud.

The analyze module in the cloud will parse and analyze received data from the consumer.

After calculations, the system provides results with available bundles of services related to the chosen route (i.e. a service bundle for purchase) and/or provides a route based on a preferred bundle of services.

Quality of Service (QoS)-Base

Consumer selects terrestrial area (example, by using Map API, natural language processing search, Voice (Ski like), etc.).

After consumer's input, the system sends provided data to the cloud.

The analyze module in the cloud will parse and analyze received data from consumer.

After calculations, the system provides results as a list of all available services based on consumer preferences (e.g. the result can be provided as multilayer map).

Figure 6:
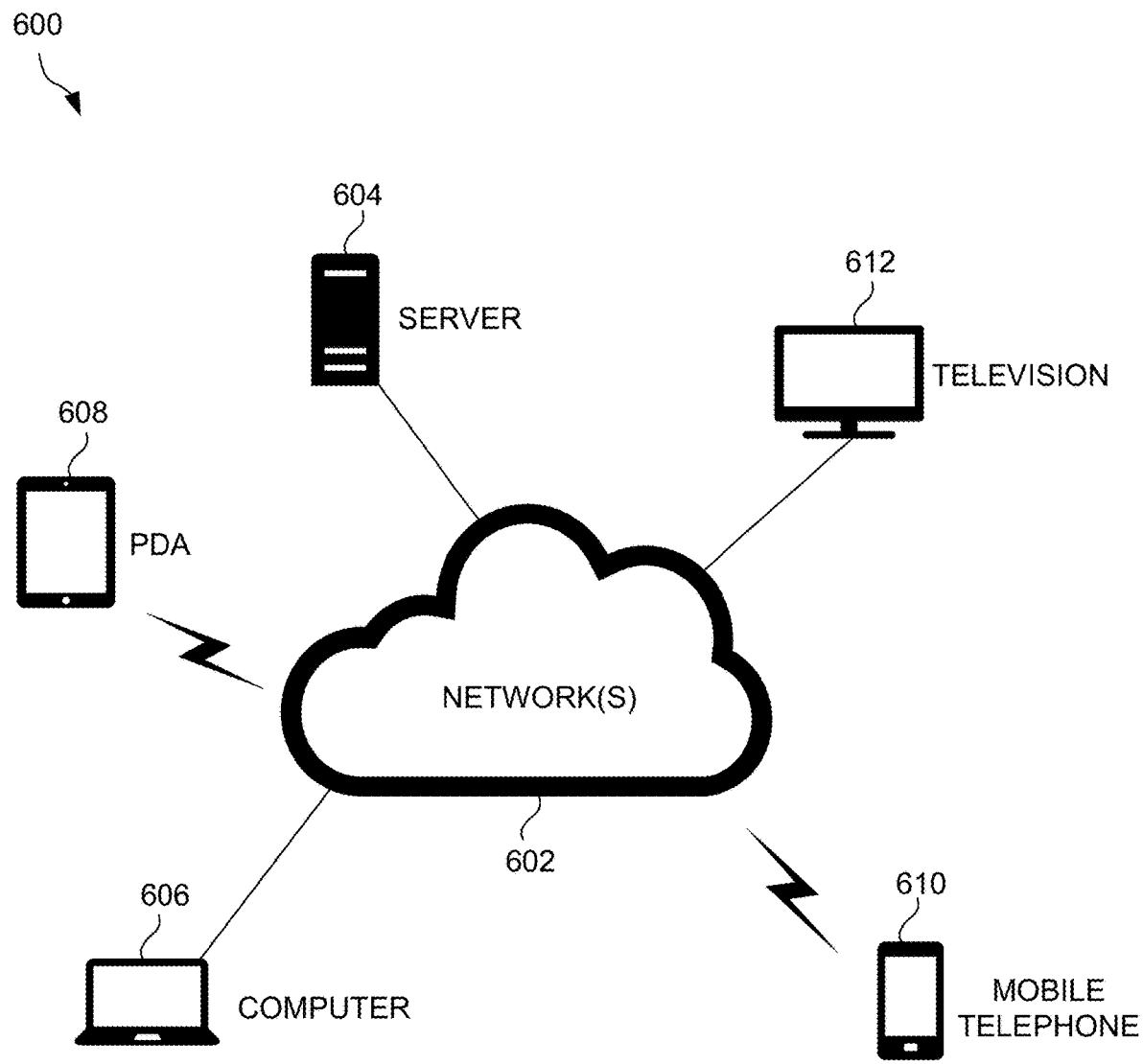
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
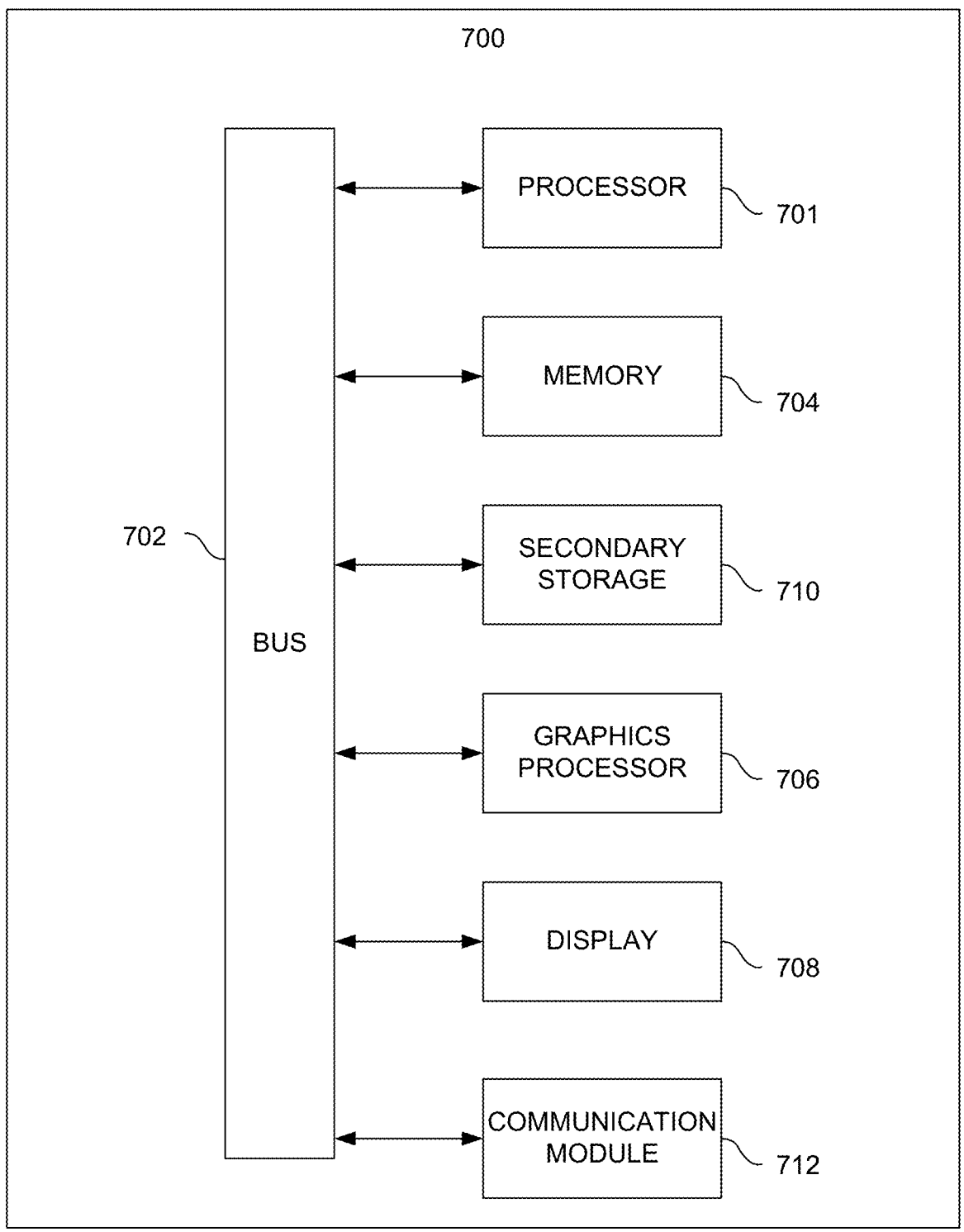
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   determining at least one physical target destination of a consumer device;
   predicting a quality of service (QOS) of a network at each physical target destination of the at least one physical target destination; and
   making one or more travel route recommendations to the consumer device, based on the predicted QOS of the network at each physical target destination of the at least one physical target destination, wherein each travel route recommendation of the one or more travel route recommendations is a recommendation for a different geographical route that the consumer device is capable of physically traveling to arrive at the physical target destination.

2. The non-transitory computer readable medium of claim 1, wherein the at least one physical target destination includes a plurality of physical destinations along an expected travel route of the consumer device.

3. The non-transitory computer readable medium of claim 1, further comprising:
   gathering event information for each physical target destination of the at least one physical target destination.

4. The non-transitory computer readable medium of claim 3, wherein the event information includes current events, future events and past events associated with the physical target destination.

5. The non-transitory computer readable medium of claim 3, wherein the event information is gathered from a plurality of different sources.

6. The non-transitory computer readable medium of claim 5, wherein the plurality of different sources includes a plurality of different websites.

7. The non-transitory computer readable medium of claim 1, wherein the QOS at each physical target destination of the at least one physical target destination is predicted using a machine learning model.

8. The non-transitory computer readable medium of claim 7, wherein the machine learning model predicts the QOS at each physical target destination of the at least one physical target destination based on past QOS at the physical target destination and any events at the physical target destination.

9. The non-transitory computer readable medium of claim 8, wherein the events include future events at the physical target destination.

10. The non-transitory computer readable medium of claim 9, wherein the machine learning model predicts the QOS at each physical target destination of the at least one physical target destination further based on expected attendance at the future events at the physical target destination.

11. The non-transitory computer readable medium of claim 10, wherein the expected attendance is predicted using an additional machine learning model.

12. The non-transitory computer readable medium of claim 8, wherein the events include emergency events at the physical target destination.

13. The non-transitory computer readable medium of claim 8, wherein the machine learning model predicts the QOS at each physical target destination of the at least one physical target destination further based on a number of cell towers and signal strength at the physical target destination.

14. The non-transitory computer readable medium of claim 1, wherein the one or more travel route recommendations include a new travel route to the physical target destination, the new travel route having an improved QOS with respect to the predicted QOS of each physical target destination of the at least one physical target destination, and wherein the new travel route is determined based on preferences of the consumer device, including a preferred network service provider device.

15. The non-transitory computer readable medium of claim 1, wherein the one or more travel route recommendations include an optimal list of network service providers on an existing travel route of the consumer device.

16. The non-transitory computer readable medium of claim 1, wherein the one or more travel route recommendations indicate coverage data of network service providers on an existing travel route of the consumer device.

17. The non-transitory computer readable medium of claim 1, wherein the one or more travel route recommendations are provided to the consumer device via one or more push notifications.

18. The non-transitory computer readable medium of claim 1, further comprising:
outputting a visualization of a multi-layer map with timeline-based network quality.

19. A method, comprising:
determining at least one physical target destination of a consumer device;
predicting a quality of service (QOS) of a network at each physical target destination of the at least one physical target destination; and
making one or more travel route recommendations to the consumer device, based on the predicted QOS of the network at each physical target destination of the at least one physical target destination, wherein each travel route recommendation of the one or more travel route recommendations is a recommendation for a different geographical route that the consumer device is capable of physically traveling to arrive at the physical target destination.

20. A system, comprising:
a non-transitory memory storing instructions; and
one or more processors in communication with the non-transitory memory that execute the instructions to perform a method comprising:
determining at least one physical target destination of a consumer device;
predicting a quality of service (QOS) of a network at each physical target destination of the at least one physical target destination; and
making one or more travel route recommendations to the consumer device, based on the predicted QOS of the network at each physical target destination of the at least one physical target destination, wherein each travel route recommendation of the one or more travel route recommendations is a recommendation for a different geographical route that the consumer device is capable of physically traveling to arrive at the physical target destination.

* * * * *